(12) United States Patent
Simmons et al.

(10) Patent No.: US 8,517,300 B2
(45) Date of Patent: Aug. 27, 2013

(54) COMPOSITE MATERIALS

(75) Inventors: Martin Simmons, Baldock (GB); John Cawse, West Wratting (GB)

(73) Assignee: Hexcel Composites Limited, Duxford (GB)

( * ) Notice: Subject to any disclaimer, the term of this patent is extended or adjusted under 35 U.S.C. 154(b) by 294 days.

(21) Appl. No.: 12/934,107

(22) PCT Filed: Mar. 6, 2009

(86) PCT No.: PCT/GB2009/000616
§ 371 (c)(1),
(2), (4) Date: Oct. 8, 2010

(87) PCT Pub. No.: WO2009/118509
PCT Pub. Date: Oct. 1, 2009

(65) Prior Publication Data
US 2011/0017867 A1  Jan. 27, 2011

Related U.S. Application Data

(63) Continuation-in-part of application No. 12/221,635, filed on Aug. 5, 2008.

(30) Foreign Application Priority Data

Mar. 28, 2008  (GB) .................................. 0805640.0

(51) Int. Cl.
*B64D 45/02*  (2006.01)
(52) U.S. Cl.
USPC .......................................... 244/1 A; 244/133

(58) Field of Classification Search
USPC .......................................... 244/1 A, 132, 133
See application file for complete search history.

(56) References Cited

U.S. PATENT DOCUMENTS

| | | | |
|---|---|---|---|
| 4,352,142 A | 9/1982 | Olson | |
| 4,502,092 A | 2/1985 | Bannink, Jr. et al. | |
| 4,522,889 A * | 6/1985 | Ebneth et al. | 428/614 |
| 5,370,921 A * | 12/1994 | Cedarleaf | 428/138 |
| 6,679,667 B2 | 1/2004 | Brown et al. | |
| 7,050,286 B2 | 5/2006 | Pridham et al. | |
| 2002/0119028 A1 * | 8/2002 | Brown et al. | 411/372.5 |
| 2007/0093163 A1 * | 4/2007 | Brown | 442/229 |
| 2008/0073098 A1 * | 3/2008 | Gonzalez et al. | 174/2 |

FOREIGN PATENT DOCUMENTS

| | | |
|---|---|---|
| EP | 0139193 | 5/1985 |
| WO | 9951494 | 10/1999 |
| WO | 2008048705 | 4/2008 |

* cited by examiner

Primary Examiner — Timothy D Collins
Assistant Examiner — Nicholas McFall
(74) Attorney, Agent, or Firm — W. Mark Bielawski; David J. Oldenkamp

(57) ABSTRACT

A composite material, the composite material comprising a prepreg, said prepreg comprising at least one polymeric resin and at least one conductive fibrous reinforcement, electrically conducting particles dispersed in the polymeric resin and a top layer of a metal-coated carbon fiber comprising a further resin component, wherein the metal comprises one or more metals selected from nickel, copper, gold, platinum, palladium, indium and silver.

19 Claims, 3 Drawing Sheets

COMPOSITE MATERIALS

This application is a continuation-in-part of copending U.S. patent application Ser. No. 12/221,635 filed Aug. 5, 2008, which is the United States National Stage of PCT/GB2007/004220.

The present invention relates to composite materials, and particularly to coated fibre reinforced composite materials which exhibit increased electrical conductivity.

Composite materials are increasingly used in structural applications in many fields owing to their attractive mechanical properties and low weight in comparison to metals. Composites consist of layering of materials to provide a structurally advantageous laminate type material. However, whilst electrical conductivity is one of the most obvious attributes of metals, composite materials based on fibre reinforcements (such as adhesive films, surfacing films, and pre-impregnated (prepreg) materials) generally have much lower electrical conductivity.

Conventional composite materials usually consist of a reinforcement phase, generally comprising continuous or discontinuous fibres, and a matrix phase, generally a thermoset or thermoplastic polymer. Most early first generation matrix polymers for the manufacture of composites were, by nature, brittle and it has therefore been necessary to develop more toughened versions. The composite materials used as primary structures in aerospace applications tend to be so-called second or third generation toughened materials.

There is a particular need for composite materials which exhibit electrical conductivity for several applications. These applications include use for protection against lightning strikes, electrostatic dissipation (ESD), and electromagnetic interference (EMI). Existing composite materials, such as those based upon carbon fibres, have some electrical conductivity which is usually associated with the graphitic nature of the carbon filaments. However, the level of electrical conductivity is insufficient for protecting the composite material from the damaging effects of strong electrical discharges such as a lightning strike.

Second generation toughened composites represent an improvement over earlier first generation materials due to incorporation of toughening phases within the matrix material. Improved electrical conductivity is commonly introduced into these materials by various means. This includes incorporation of metals into the assembly via expanded foils, metal meshes, or interwoven wires. Typical metals used for this purpose include aluminium, bronze and copper. These composite materials can provide better electrical conductivity. However, they are generally heavy and have significantly degraded mechanical and aesthetic properties. These composites are usually found at the first one or two plies of the material, and therefore a poor overall surface finish often results.

In the event of a lightning strike on second generation composites, damage is normally restricted to the surface protective layer. The energy of the lightning strike is typically sufficient to vaporise some of the metal and to burn a small hole in the mesh or other protective layer. Damage to the underlying composite may be minimal, being restricted to the top one or two plies. Nevertheless, after such a strike it would be necessary to cut out the damaged area and make good with fresh metal protection and, if required, fresh composite.

As already mentioned, materials with carbon fibres possess some electrical conductivity. However, the conductivity pathway is only in the direction of the fibres, with limited ability for dissipation of electrical current in directions orthogonal to the plane of the fibre reinforcement (the z-direction). Carbon reinforced materials often comprise an interleaf structure, often comprising a resin layer of some sort, which results in inherently low conductivity in the z-direction due to the electrical insulation properties of the interleaf. The result of such an arrangement can lead to disastrous effects when struck by lightning as the electrical discharge can enter the interleaf, volatilise the resin therein, and cause mass delamination and penetration through the composite material.

Other conducting particles such as carbon black, polypyrrole, carbon nanofibres, and mixtures thereof, have been used alone as additives in composite materials, but have not been shown to improve resistance to damage caused by e.g. a lightning strike.

Addition of metal-coated particles to interleaf type prepregs has been shown to be effective in reducing the level of damage caused by a lightning strike to a composite, but the damage to the surface and lower plies can be reduced still further.

So-called third generation toughened composite materials are based on interleaf technology where resinous layers are alternated with fibre reinforced plies, and provide protection against impacts. However, these resin layers act as an electrical insulator and therefore electrical conductivity in the z-direction of the material is poor (i.e. orthogonal to the direction of the fibres). Lightning strikes on the composite material can result in catastrophic failure of the component, with a hole being punched through a multiple ply laminate.

The present invention therefore seeks to provide a composite material which has improved electrical conductivity properties in comparison to previous attempts as described herein, and has little or no additional weight compared to a standard composite material. The present invention also seeks to provide a composite material which has improved electrical conductivity without detriment to the mechanical performance of the material. The present invention further seeks to provide a method of making the composite material having improved electrical conductivity properties.

A further aim is to provide a lightning strike tolerant composite material which is convenient to manufacture, use, and repair.

According to a first aspect of the present invention there is provided a composite material comprising:

i) a prepreg comprising at least one polymeric resin and at least one conductive fibrous reinforcement;

ii) electrically conductive particles dispersed in the polymeric resin; and iii) a top layer of a metal-coated carbon fibre comprising a further resin component, wherein the metal comprises one or more metals selected from nickel, copper, gold, platinum, palladium, indium and silver.

According to a second aspect of the present invention there is provided a method of making a composite material comprising the steps of;

i) providing a prepreg comprising at least one polymeric resin and at least one conductive fibrous reinforcement;

ii) dispersing electrically conductive particles in the polymeric resin; and iii) adding a top layer of a metal-coated carbon fibre comprising a further resin component, wherein the metal comprises one or more metals selected from nickel, copper, gold, platinum, palladium, indium and silver.

The top layer can be added during or after the manufacture of the prepreg and can be consolidated in place using adhesion afforded by the resin contained in the prepreg.

It has been found that using conducting particles in a polymeric resin of a prepreg in combination with a layer of a metal-coated carbon fibre comprising a further resin component, wherein the metal comprises one or more metals selected from nickel, copper, gold, platinum, palladium, indium and silver, as a top ply to the prepreg, provides reduced bulk resistivity, surface resistivity and improved z-directional electrical conductivity through the composite material. Additionally, it has been found that the conducting particles dispersed in the resin formulation, and subsequently prepregged, result in a prepreg having substantially similar handling characteristics to an equivalent unmodified prepreg.

The use of a layer of a metal-coated carbon fibre comprising a further resin component, wherein the metal comprises one or more metals selected from nickel, copper, gold, platinum, palladium, indium and silver, as a top layer to the prepreg composite material containing metal-coated particles augments the electrical conductivity properties of the prepreg composite material. This makes the composite material even more resistant to damage which may be sustained by a strong electrical discharge such as a lightning strike.

References to a composite material include materials which comprise a fibrous reinforcement where the polymeric resin is in contact with the fibre but not impregnated in the fibre. The term composite material also includes an alternative arrangement in which the resin is partially embedded or partially impregnated in the fibre, commonly known in the art as prepreg. The prepreg may also have a fully impregnated fibrous reinforcement layer. The composite material may also include multilayered materials which have multiple fibre-resin-fibre layers.

References to "interleaf structure" refer to the multi-layered material having a fibre-resin-fibre structure. The term "interleaf" refers to the polymeric resin which is present, and interleaved, between the fibre layers. References to "interleaf thickness" are to the average distance across the interleaf layer as measured from the uppermost surface of a lower fibre ply to a lowermost surface of an upper fibre ply. The interleaf thickness is therefore equivalent to the thickness of the interleaved polymeric resin layer, and references to interleaf thickness and polymeric resin thickness are interchangeable.

The terms interlayer, interleaf resin layer, interply resin layer, and fibre-free layer as used herein are all interchangeable, and refer to the polymeric resin layer.

The term polymeric resin as used herein refers to a polymeric system.

The term "polymeric resin" and "polymeric system" are used interchangeably in the present application, and refer to mixtures of chain lengths of resins having varying chain lengths. The term polymeric therefore includes an embodiment where the resins present are in the form of a resin mixture comprising any of monomers, dimers, trimers, or resins having a chain length greater than 3. The resulting polymeric resin when cured forms a cross-linked matrix of resin.

Bulk resistivity refers to the measurement of the "bulk" or "volume" resistivity of a semi-conductive material. It can be seen that reference to an "initial bulk resistivity" relates to the bulk resistivity of a polymeric resin prior to addition of conducting particles. The value in Ohms-m is the inherent resistance of a given material. Ohms-m ($\Omega$m) is used for measuring the resistivity of a three dimensional material. The bulk electrical resistivity $\rho$ of a material is usually defined by the following:

$$\rho = \frac{RA}{l}$$

where;

$\rho$ is the static resistivity (measured in ohm meters),
R is the electrical resistance of a uniform specimen of the material (measured in ohms),
l is the length of the specimen (measured in meters)
A is the cross-sectional area of the specimen (measured in square meters)

In the present invention, the volume resistivity is only measured in the z-direction (through the composite material thickness). In every case it is referenced as the "volume" resistivity as the thickness is always taken into consideration in the calculation.

The aim of the invention is achieved by incorporating a top layer of a metal-coated carbon fibre comprising a further resin component, wherein the metal comprises one or more metals selected from nickel, copper, gold, platinum, palladium, indium and silver, onto the prepreg, in addition to incorporating into the interleaf region of the prepreg a low volume fraction of conducting particles at a level wholly insufficient to impart electrical conductivity to the polymeric resin itself (i.e. in the absence of carbon fibre) from which the prepreg is made.

Furthermore, it has been found that addition of conducting particles, such as carbon particles and silver coated glass spheres, to the composite material, and also a top layer of a metal-coated carbon fibre comprising a further resin component, wherein the metal comprises one or more metals selected from nickel, copper, gold, platinum, palladium, indium and silver, reduces bulk resistivity and therefore provides electrical conductance levels which exceed those that might have been reasonably expected.

Typically, the total amount of metal coating ranges from about 10 to about 65% by weight of the fibre.

Any of the metals nickel, copper, gold, platinum, palladium, indium and silver may be used to coat the carbon fibre, either alone or in combination, but typically nickel is used to coat the carbon fibre in combination with one or more metals selected from copper, gold, platinum, palladium, indium and silver. More typically, a copper-nickel coating is used to coat the carbon fibre.

The efficiency of the metal-coated carbon fibre layer is such that the total number of conducting plies used in the composite assembly may be reduced, thus enabling the conducting plies to be restricted to the outer part where lightning protection is most crucial. In addition, any damage caused by lightning strikes is substantially confined to the outer ply due to the increased conductivity of the composite material of the invention.

The composite material of the invention is convenient for manufacture because existing parasitic materials are difficult to handle. In the invention, the carbon fibre layer can be incorporated readily into prepreg and could easily, if necessary, be supplied as an integral product.

Additionally, the surface finish is good and the composite material of the invention can be processed like prepreg.

A further benefit of the invention is an improved thermal conductivity for the prepreg, leading to faster heat up times and better dissipation of the heat generated during the cure exotherm. A still further benefit is that the electrical resistance of the composite material is essentially unchanged with variation in temperature.

The reduction in bulk resistivity and improvement in conductivity results in improved lightning strike performance. This improvement achieved by the invention is therefore surprising in view of the low levels of electrically conductive particles employed, and the high electrical resistivity normally exhibited by the interleaf resin itself.

The terms "resistivity" and "conductivity" used herein refer to electrical resistivity and electrical conductivity, respectively.

As used herein, the term "particles" refers to discrete three dimensional shaped additives which are distinct, treated as an individual units, and separable from other individual additives, but this does not preclude additives from being in contact with one another. The term embraces the shapes and sizes of electrically conductive particles described and defined herein.

The term "aspect ratio" used herein is understood to refer to the ratio of the longest dimension to the shortest dimension of a three dimensional body. The term is applicable to additives of any shape and size as used herein. Where the term is used in relation to spherical or substantially spherical bodies, the relevant ratio would be that of the largest cross sectional diameter with the smallest cross sectional diameter of the spherical body. It will therefore be understood that a perfect sphere would have an aspect ratio of unity. The aspect ratios as specified herein for electrically conductive particles are based on the dimensions of the particles after any metal coating has been applied.

The layer of metal-coated carbon fibre typically comprises non-woven carbon fibre, as it is has an excellent surface finish, but may also instead comprise woven or knitted fabrics. Alternatively, chopped metal coated carbon fibres could be applied directly to the prepreg surface. It is important that the carbon fibre is lightweight.

The carbon fibre can vary in areal weight from about 5 gsm to about 100 gsm. The addition of a 34 gsm carbon fibre layer is able to reduce the damage caused by a lightning strike by about 30-40% in area and depth.

References to the size of the electrically conductive particles are to the largest cross-sectional diameter of the particles.

Exemplary electrically conductive particles may include, but are not limited to, spheres, microspheres, dendrites, beads, powders, any other suitable three-dimensional additives, or any combination thereof.

The conductive particles used in the present invention may comprise any conductive particles capable of reducing bulk resistivity and thereby facilitating electrical conductivity of the composite material.

The electrically conductive particles may be selected from metal-coated conducting particles, non-metallic conducting particles, or a combination thereof.

The conducting particles are dispersed in the polymeric resin. It is envisaged that the term "dispersed" may include where the conducting particles are present substantially throughout the polymeric resin without being present in a substantially higher concentration in any part of the polymeric resin. Additionally, the term "dispersed" also includes the conducting particles being present in localised areas of polymeric resin if reduced bulk resistivity is only required in specific areas of the composite material.

The metal-coated conducting particles may comprise core particles which are substantially covered by a suitable metal.

The core particles may be any suitable particles. Suitable particles include, but are not limited to, those formed from polymer, rubber, ceramic, glass, mineral, or refractory products such as fly ash.

The polymer may be any thermoplastic or thermosetting polymer. The terms 'thermoplastic polymer' and 'thermosetting polymer' are as characterised herein.

The core particles formed from glass may be any of the types used for making solid or hollow glass microspheres.

Non-limiting examples of suitable silica containing glass particles include soda glass, borosilicate, and quartz. Alternatively, the glass may be substantially silica free. Suitable silica-free glasses include, by way of example only, chalcogenide glasses.

The core particles may be porous or hollow or may themselves be a core-shell structure, for example core-shell polymer particles. The core particles may be first coated with an activating layer, an adhesion promoting layer, a primer layer, a semi-conducting layer or another layer prior to being metal coated.

The core particles are typically hollow particles formed from glass. Use of hollow core particles formed from glass may be advantageous in applications where weight reduction is of particular importance.

Mixtures of the core particles may be used to obtain, for example, lower densities or other useful properties, for instance a proportion of hollow metal-coated glass particles may be used with a proportion of metal-coated rubber particles to obtain a toughened layer with a lower specific gravity.

Metals suitable for coating the core particles include, but are not limited to, silver, gold, nickel, copper, tin, aluminium, platinum, palladium, and any other metals known to possess high electrical conductivity, or a combination of any two or more thereof. Typically, silver is used for its high conductivity.

Multiple layers of metal coatings may be used to coat the core particles, for example gold-coated copper and silver-coated copper. Simultaneous deposition of metals is also possible, thereby producing mixed metal coatings.

The metal coating may be carried out by any of the means known for coating particles. Examples of suitable coating processes include chemical vapour deposition, sputtering, electroplating, or electroless deposition.

The metal may be present as bulk metal, porous metal, columnar, microcrystalline, fibrillar, dendritic, or any of the forms known in metal coating. The metal coating may be smooth, or may comprise surface irregularities such as fibrils, or bumps so as to increase the specific surface area and improve interfacial bonding.

The metal coating may be subsequently treated with any of the agents known in the art for improving interfacial bonding with the polymeric resin, for example silanes, titanates, and zirconates.

The electrical resistivity of the metal coating should be preferably less than $3 \times 10^{-5}$ $\Omega m$, more preferably less than $1 \times 10^{-7}$ $\Omega m$, and most preferably less than $3 \times 10^{-8}$ $\Omega m$.

The metal-coated conducting particles may be of any suitable shape, such as spherical, ellipsoidal, spheroidal, discoidal, dendritic, rods, discs, acicular, cuboid or polyhedral. Finely chopped or milled fibres may also be used, such as metal-coated milled glass fibres. The particles may have well defined geometries or may be irregular in shape.

The metal coated conducting particles typically possess an aspect ratio of <100, preferably <10, and most preferably <2.

The metal-coated conducting particle size distribution may be monodisperse or polydisperse. Preferably, at least about 90% of the metal coated particles have a size within the range of about 0.3 μm to about 100 μm, more preferably about 1 μm to about 50 μm, and most preferably between about 5 μm and about 40 μm.

The electrically conductive particles may be non-metallic conducting particles. It will be understood that this includes any suitable non-metallic particles not having a metal coating, and capable of reducing bulk resistivity and thereby facilitating electrical conductivity of the composite material.

Suitable non-metallic conducting particles include, but are not limited to, graphite flakes, graphite powders, graphite particles, graphene sheets, fullerenes, carbon black, intrinsically conducting polymers (ICPs—including polypyrrole, polythiophene, and polyaniline), charge transfer complexes, or any combination thereof.

An example of a suitable combination of non-metallic conducting particles includes combinations of ICPs with carbon black and graphite particles.

The non-metallic conducting particle size distribution may be monodisperse or polydisperse. Preferably, at least about 90% of the non-metallic conducting particles have a size within the range about 0.3 µm to about 100 µm, more preferably about 1 µm to about 50 µm, and most preferably between about 5 µm and about 40 µm.

The electrically conductive particles have a size whereby at least about 50% of the particles present in the polymeric resin have a size within about 10 µm of the thickness of the polymeric resin layer. In other words, the difference between the thickness of the resin layer and the size of the electrically conductive particles is less than about 10 µm. Typically the electrically conductive particles have a size whereby at least about 50% of the particles present in the polymeric resin have a size within 5 µm of the thickness of the polymeric resin layer.

The size of at least about 50% of the electrically conductive particles is therefore such that they bridge across the interleaf thickness (polymeric resin layer), and the particles are in contact with an upper fibrous reinforcement ply and a lower fibrous reinforcement ply arranged about the polymeric resin layer.

The electrically conductive particles may be present in the range of about 0.2 vol. % to about 20 vol. % of the composite material. Preferably, the conducting particles are present in the range of about 0.4 vol. % to about 15 vol. %. More preferably, the conducting particles are present in the range of about 0.8 vol. % to about 10 vol. %.

In an alternative embodiment, the electrically conductive particles may be present in an amount of less than about 10 vol. % of the polymeric resin layer.

It can be seen that the preferred ranges of the electrically conductive particles are expressed in vol. % as the weight of the particles may exhibit a large variation due to variation in densities.

The electrically conductive particles may be used alone or in any suitable combination.

Without wishing to be unduly bound by theory, it has been found that the benefits of the invention may be conferred due to the conductive particles (either metal-coated or non-metallic) acting as electrical conductance bridges across the interleaf thickness (i.e. across the polymeric resin layer and between the layers of fibrous reinforcement), thereby connecting plies of fibrous reinforcement and improving the z-directional electrical conductance. The top layer of a metal-coated carbon fibre comprising a further resin component, wherein the metal comprises one or more metals selected from nickel, copper, gold, platinum, palladium, indium and silver, improves the z-directional electrical conductance still further.

It has also been found that use of electrically conductive particles with sizes substantially equal to the interleaf thickness advantageously allows for electrical conductance across the composite material (in the z-plane) to be provided at relatively low loading levels. These low loading levels of electrically conductive particles are less than would be typically required to make the polymeric resin itself electrically conducting.

The electrically conductive particles therefore facilitate electrical conductivity by lowering the bulk resistivity of the composite material.

The composite material may also comprise carbon nanomaterials. The carbon nanomaterials may be selected from any suitable carbon nanotubes and carbon nanofibres.

The carbon nanomaterials may have a diameter in the range of from about 10 to about 500 nm, preferably in the range of from about 100 to about 150 nm.

The carbon nanomaterials may preferably have a length in the range of about 1 to about 10 µm.

The carbon nanomaterials may provide additional electrically conducting pathways across the composite material (in the z-plane) by further bridging across the interleaf. The fibrous reinforcements are typically arranged in the form of layers or plies comprising a number of fibre strands. The composite material typically comprises at least two fibrous reinforcement plies which are arranged either side of a polymeric resin layer. As well as providing electrical conductivity in the x- and y-planes of the material, the plies act as supporting layers to the structure of the material, and substantially contain the polymeric resin.

The fibrous reinforcement of the prepreg may be selected from hybrid or mixed fibre systems which comprise synthetic or natural fibres, or a combination thereof. The fibrous reinforcement is formed from fibres which are electrically conductive and the fibrous reinforcement therefore is electrically conductive.

The fibrous reinforcement may typically be selected from any suitable material such as metallised glass, carbon, graphite, metallised polymer fibres (with either continuous or discontinuous metal layers), the polymer of which may be soluble or insoluble in the polymeric resin. Any combination of these fibres may be selected. Mixtures of these fibres with non-conducting fibres (such as fibreglass) may also be used.

The fibrous reinforcement is most preferably formed substantially from carbon fibres.

The fibrous reinforcement may comprise cracked (i.e. stretch-broken) or selectively discontinuous fibres, or continuous fibres. It is envisaged that use of cracked or selectively discontinuous fibres may facilitate lay-up of the cured composite material prior to being fully cured according to the invention, and improve its capability of being shaped.

The fibrous reinforcement may be in the form of woven, non-crimped, non-woven, unidirectional, or multiaxial textile tapes or tows.

The woven form is preferably selected from a plain, satin, or twill weave style. The non-crimped and multiaxial forms may have a number of plies and fibre orientations.

Such styles and forms of fibrous reinforcement are well known in the composite reinforcement field, and are commercially available from a number of companies including Hexcel Reinforcements of Villeurbanne, France.

The polymeric resin of the prepreg and the further resin component both preferably independently comprise at least one thermoset or thermoplastic resin.

The term 'thermoset resin' includes any suitable material which is plastic and usually liquid, powder, or malleable prior to curing and designed to be moulded in to a final form. The thermoset resin may be any suitable thermoset resin. Once cured, a thermoset resin is not suitable for melting and remoulding. Suitable thermoset resin materials for the present invention include, but are not limited to, resins of phenol formaldehyde, urea-formaldehyde, 1,3,5-triazine-2,4,6-triamine (melamine), bismaleimide, epoxy resins, vinyl ester resins, benzoxazine resins, phenolic resins, polyesters, unsaturated polyesters, cyanate ester resins, or a combination of any two or more thereof.

The thermoset resin is preferably selected from epoxide resins, cyanate ester resins, bismaleimide, vinyl ester, benzoxazine, and phenolic resins.

The term 'thermoplastic resin' includes any material which is plastic or deformable, melts to a liquid when heated and freezes to a brittle solid, and forms a glassy state when cooled sufficiently. Once formed and cured, a thermoplastic resin is suitable for melting and re-moulding. Suitable thermoplastic polymers for use with the present invention may include any of polyether sulphone (PES), polyether ethersulphone (PEES), polyphenyl sulphone, polysulphone, polyester, polymerisable macrocycles (e.g. cyclic butylene terephthalate), liquid crystal polymers, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO, or a combination of any two or more thereof.

The polymeric epoxy resin preferably comprises at least one of bisphenol-A (BPA) diglycidyl ether and bisphenol-F (BPF) diglycidyl ether and derivatives thereof; a tetraglycidyl derivative of 4,4'-diaminodiphenylmethane (TGDDM); a triglycidyl derivative of aminophenols, and other glycidyl ethers and glycidyl amines well known in the art.

The polymeric resin is applied to the fibrous reinforcement. The fibrous reinforcement may be fully or partially impregnated by the polymeric resin. In an alternative embodiment, the polymeric resin may be a separate layer which is proximal to, and in contact with, the fibrous reinforcement, but does not substantially impregnate said fibrous reinforcement.

The further resin component used to impregnate the carbon fibre layer may be electrically conductive or non-conductive and may comprise at least one thermoset or thermoplastic resin. Exemplary resins include, but are not limited to, all of the resin compounds listed above for the polymeric resin. The further resin component may or may not be the same resin as the polymeric resin. The further resin component may also optionally beneficially contain conducting particles (either metal-coated or non-metallic).

The composite material may include at least one curing agent. The curing agent may be substantially present in the polymeric resin. It is envisaged that the term "substantially present" means at least about 90 wt. % of the curing agent, typically about 95 wt. % of the curing agent.

For epoxy resins, the curing agents of the invention are those which facilitate the curing of the epoxy-functional compounds of the invention, and, particularly, facilitate the ring-opening polymerisation of such epoxy compounds. In a particularly preferred embodiment, such curing agents include those compounds which polymerise with the epoxy-functional compound or compounds, in the ring-opening polymerisation thereof. Curing agents typically include cyanoguanidine, aromatic and aliphatic amines, acid anhydrides, Lewis acids, substituted ureas, imidazoles and hydrazines.

Two or more such curing agents may be used in combination.

Suitable curing agents include anhydrides, particularly polycarboxylic anhydrides such as nadic anhydride (NA), methylnadic anhydride, phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, or trimellitic anhydride.

Further suitable curing agents are amines, including aromatic amines, such as 1,3-diaminobenzene, 1,4-diaminobenzene, 4,4'-diaminodiphenylmethane, and the polyaminosulphones, such as 4,4'-diaminodiphenyl sulphone (4,4'-DDS), and 3,3'-diaminodiphenyl sulphone (3,3'-DDS).

Also, suitable curing agents may include phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400.

Yet further suitable resins containing phenolic groups can be used, such as resorcinol-based resins, and resins formed by cationic polymerisation, such as dicyclopentadiene-phenol copolymers. Still additional suitable resins are melamine-formaldehyde resins, and urea-formaldehyde resins.

Different commercially available compositions may be used as curing agents in the present invention. One such composition is AH-154, a dicyandiamide type formulation, available from Ajinomoto USA Inc. Others which are suitable include Ancamide 1284, a mixture of 4,4'-methylenedianiline and 1,3-benzenediamine, which is available from Pacific Anchor Chemical, Performance Chemical Division, Air Products and Chemicals, Inc., Allentown, USA.

The curing agent is selected such that it provides curing of the resin component of the composite material when combined therewith at suitable temperatures. The amount of curing agent required to provide adequate curing of the resin component will vary depending upon a number of factors including the type of resin being cured, the desired curing temperature, and the curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS).

The curing agent, if present, may be present in the range of about 45 wt. % to about 2 wt. % of the composite material. More typically, the curing agent may be present in the range of about 30 wt. % to about 5 wt. %. Most typically, the curing agent may be present in the range of about 25 wt. % to about 5 wt. %.

Accelerators, if present, are typically urones. Suitable accelerators, which may be used alone or in combination include N,N-dimethyl, N'-3,4-dichlorophenyl urea (Diuron), N'-3-chlorophenyl urea (Monuron), and preferably N,N-(4-methyl-m-phenylene bis[N',N'-dimethylurea] (TDI urone).

The composite material and/or the carbon fibre layer may also include additional ingredients such as performance enhancing or modifying agents. The performance enhancing or modifying agents, by way of example only, may be selected from flexibilisers, toughening agents/particles, additional accelerators, core shell rubbers, flame retardants, wetting agents, pigments/dyes, flame retardants, plasticizers, UV absorbers, anti-fungal compounds, fillers, viscosity modifiers/flow control agents, tackifiers, stabilisers, inhibitors, or any combination of two or more thereof.

Toughening agents/particles may include, by way of example only, any of the following either alone or in combination: polyamides, copolyamides, polyimides, aramids, polyketones, polyetheretherketones, polyarylene ethers, polyesters, polyurethanes, polysulphones, high performance hydrocarbon polymers, liquid crystal polymers, PTFE, elastomers, and segmented elastomers.

Toughening agents/particles, if present, may be present in the range of about 45 wt. % to about 0 wt. % of the composite material. More typically, they may be present in the range of about 25 wt. % to about 5 wt. %. Most typically, they may be present in the range of about 15 wt. % to about 10 wt. %.

A suitable toughening agent/particle, by way of example, is Sumikaexcel 5003P, which is commercially available from Sumitomo Chemicals of Tokyo, Japan. Alternatives to 5003P are Solvay polysulphone 105P, and Solvay 104P which are commercially available from Solvay of Brussels, Belgium.

Suitable fillers may include, by way of example only, any of the following either alone or in combination: silicas, aluminas, titania, glass, calcium carbonate, and calcium oxide.

Suitable pigments may include, by way of example only, titanium dioxide. This reduces the requirement for primer and paint, thereby further improving the benefits of the composite material of the invention as a material for withstanding a lightning strike with minimum damage.

The composite material may comprise an additional polymeric resin which is at least one thermoset or thermoplastic resins as defined previously.

Whilst it is desirable that the majority of electrically conductive particles are located within the polymeric resin of the composite material, it is not generally detrimental if a small percentage of such particles are distributed within the fibrous reinforcement. The conducting particles may be suitably dispersed within the polymeric resin of the prepreg by conventional mixing or blending operations.

The mixed resin containing all the necessary additives and the conducting particles can be incorporated into prepreg by any of the known methods, for example a so-called lacquer process, resin film process, extrusion, spraying, printing or other known methods.

In a lacquer process all the resin components are dissolved or dispersed in a solvent and the fibrous reinforcement is dipped in the solvent, and the solvent is then removed by heat. In a resin film process the polymeric resin is cast as a continuous film, either from a lacquer or a hot melt resin, onto a substrate which has been treated with a release agent, and then the coated film is contacted against the fibrous reinforcement and, under the aid of heat and pressure, the resin film melts and flows into the fibres. A multiplicity of films may be used and one or both sides of the fibre layer may be impregnated in this way.

If the prepreg is made by a film or lacquer process, the majority of the conducting particles will be "filtered" by the reinforcing fibres and thus will be substantially prevented from entering the fibrous reinforcement because the particle size is larger than the distance between the reinforcing fibres. Other processes such as spraying or printing would enable the conducting particles to be placed directly onto the fibrous reinforcement with very low penetration of the said particles between the fibres.

When metal coated hollow particles are used, it may be necessary to utilise lower shear mixing equipment to reduce the deforming effect that mixing may produce on the conducting particles.

The prepreg may be in the form of continuous tapes, towpregs, fabrics, webs, or chopped lengths of tapes, towpregs, fabrics, or webs. The prepreg may also function as an adhesive or surfacing film, and may additionally have embedded carriers in various forms both woven, knitted, and non-woven.

Prepregs formulated according to the present invention may be fabricated into final components using any of the known methods, for example manual lay-up, automated tape lay-up (ATL), automated fibre placement, vacuum bagging, autoclave cure, out of autoclave cure, fluid assisted processing, pressure assisted processes, matched mould processes, simple press cure, press-clave cure, or continuous band pressing.

According to one embodiment of the invention, the composite material may comprise a single ply of conductive fibrous reinforcement, which has applied on one side a polymeric resin layer comprising electrically conductive particles. The composite material may be manufactured in a single ply embodiment and subsequently be formed into multiple layers to provide an interleaf structure by lay-up. The interleaf structure is therefore formed during lay-up where a fibre-resin-fibre configuration arises.

The composite material may therefore comprise a single prepreg. Alternatively, the composite material may comprise a plurality of prepregs.

The polymeric resin layer thickness of the prepreg is preferably in the range of about 1 μm to about 100 μm, more preferably about 1 μm to about 50 μm, and most preferably about 5 μm to about 50 μm.

Multiple layers of conductive composite materials may be used. Thus, by way of example, an assembly may be prepared using 12 plies of standard composite materials, and 4 plies of composite materials comprising conducting particles of the present invention, thus enhancing the conductivity of the final assembly. As a further example, a laminate assembly could be prepared from 12 plies of standard composite materials, and composite material comprising conducting particles and with no carbon fibre reinforcement. Optionally, where a composite material of the present invention is used, an electrically isolating layer can be placed between the carbon fibre plies and the resin surface. For example, a glass reinforced fibrous layer can be used as the isolating layer. It is understood that there are many possible assemblies that could be used, and those described herein are by way of example only.

A further benefit is that the composite material of the present invention, prior to being fully cured, is completely flexible and is suitable for automated tape lay-up processes which are increasingly used in the manufacture of large composite structures in the aerospace industry.

The composite material of the invention may be fully or partially cured using any suitable temperature, pressure, and time conditions known in the art.

The composite material may be cured using a method selected from UV-visible radiation, microwave radiation, electron beam, gamma radiation, or other suitable thermal or non-thermal radiation.

Thus, according to a fourth aspect of the present invention there is provided a method of making a cured composite material comprising the steps of the second aspect, and subsequently curing the composite material.

The curing step of the fourth aspect may be using any known method. Particularly preferred are curing methods as described herein.

There is thus provided a cured composite material which comprises a composite material according to the first aspect of the present invention, wherein the composite material is cured.

When the composite material is cured, the further resin component in the metal-coated carbon fibre layer is also cured simultaneously.

Whilst most of the following discussion concentrates on lightning strike protection, it will readily be seen that there are many potential applications for a composite material exhibiting reduced bulk resistivity and high electrical conductivity. Thus, the level of conductivity achieved by the present invention will make the resulting composite materials suitable for use in electromagnetic shielding, electrostatic protection, current return, and other applications where enhanced electrical conductivity is necessary.

Furthermore, although much of the discussion centres around aerospace components, it is also possible to apply the present invention to lightning strike and other electrical management problems in wind turbines, buildings, marine craft, trains, automobiles and other areas of concern.

It is envisaged that the present invention, when used for aerospace components, can be used for primary structure applications (i.e. those parts of the structure which are critical for maintaining the integrity of the airplane), as well as secondary structure applications.

Thus, there is provided a process for making an aerospace article formed from a cured composite material comprising the steps of:
  making a cured composite material in accordance with the method of the fourth aspect; and
  using the cured composite material to produce an aerospace article by any method.

According to a further aspect of the invention there is provided an aerospace article comprising the cured composite material of the invention.

All of the features described herein may be combined with any of the above aspects, in any combination.

In order that the present invention may be more readily understood, reference will now be made, by way of example and illustration only, to the following description and accompanying drawings, in which.

Figure 8:
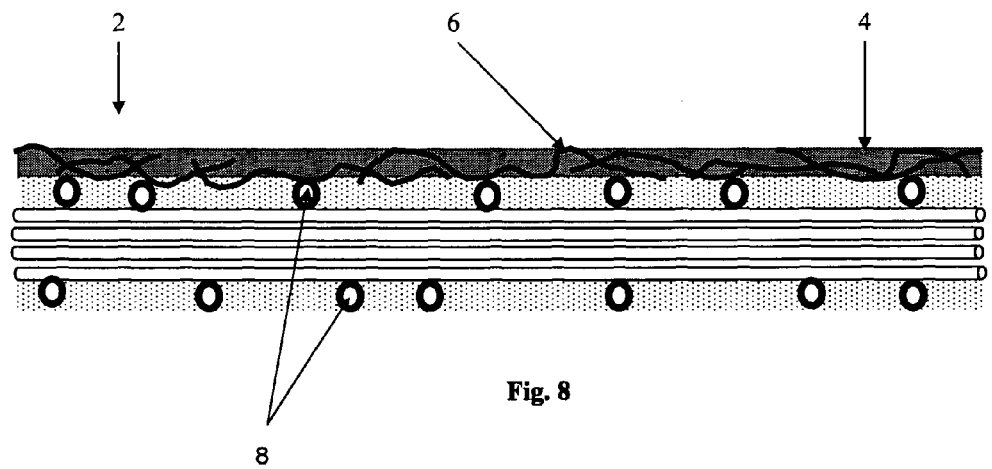
FIG. 8 shows a prepreg assembly having a metal-coated fibrous surface layer integrally attached to the conducting prepreg and having metal-coated particles. Other particulate material is not shown (e.g. thermoplastic particles in the prepreg resin).

In FIG. 8 a prepreg assembly 2 having a resin surface layer 4 comprising metal-coated fibres 6 integrally attached to the conducting prepreg and having metal-coated conducting 8 particles can be seen. Other particulate material, such as thermoplastic particles in the prepreg resin, is not shown in the Figure.

Figure 9:
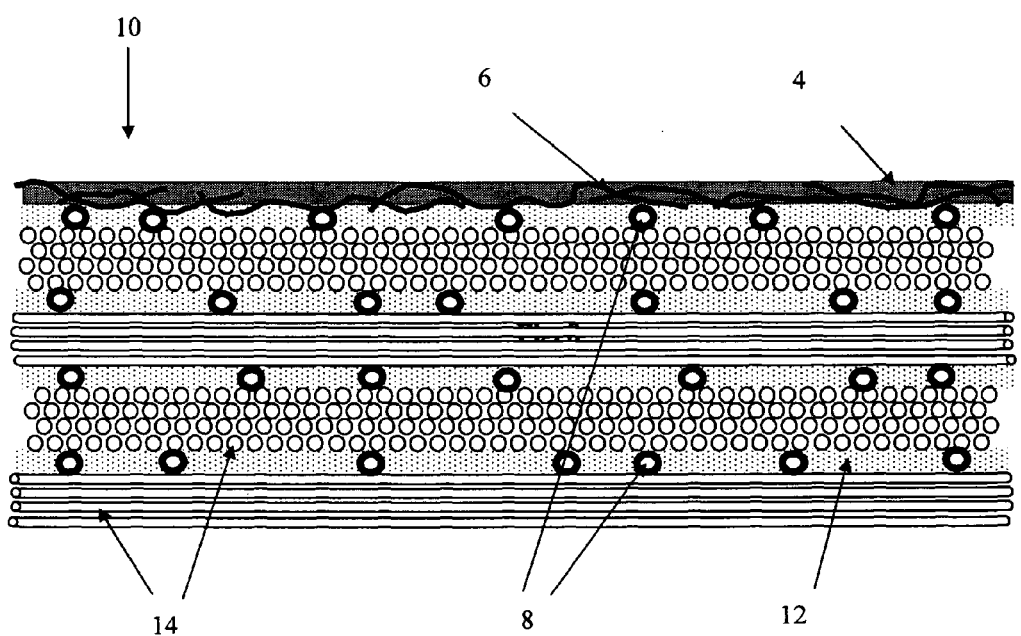
FIG. 9 shows a prepreg assembly having a plurality of layers of conductive prepreg and a surface layer comprising the metal coated fibrous layer. Resin I may be the same as Resin II or different.

FIG. 9 shows another prepreg assembly 10 having a plurality of layers of conductive prepreg with a polymeric resin 12 (Resin I) and conductive carbon fibre reinforcements 14, and a surface layer comprising a resin 4 (Resin II) and the metal coated fibrous layer 6. Resin I may be the same as Resin II or they may be different resins.

EXPERIMENTAL

In the following examples, "carbon composite" refers to the basic matrix resin, in the presence of reinforcing carbon fibres, used for manufacturing prepreg. HexPly M21 is an interleaved epoxy resin prepreg material available from Hexcel Composites, Duxford, Cambridge, United Kingdom.

Comparative Example 1

Carbon Composite

M21 resin was produced using a Winkworth mixer (Z-blade mixer) and then filmed onto silicone release paper. This resin film was then impregnated onto unidirectional intermediate modulus carbon fibre, using a pilot scale UD prepregger, which produced a prepreg with an areal weight of 190 g/m$^2$ at 35 wt. % of resin. Two six-ply prepregs were produced (lay up 0/90) which were approximately 60 cm by 60 cm and these were cured on a vacuum table at a pressure of 7 bar at 177° C. for 2 hours.

The panels were tested to zone 1A; surfaces of the aeroplane for which there is a high probability of initial lightning flash attachment (entry or exit) with low probability of flash hang on, such as radomes and leading edges. Zone 1A also includes swept leaders attachment areas. The zone 1A test has three waveform components, high current component A ($2\times10^6$ A, <500 μs), intermediate current component B (average 2 kA, <5 ms) and continuing current component C (200C, <1 s). Both surfaces of the panels were abraded around the edges to ensure a good connection to the outer frame. Zone 1A refers to all areas of the aircraft surfaces where a first return stroke is anticipated during lightning channel attachment with a low likelihood of flash hang on.

The electrode was connected to the panel via a thin copper wire. The copper wire provides a path for the current and vaporises on test. It is needed as the voltage generated is not enough to break down the air.

Figure 1:
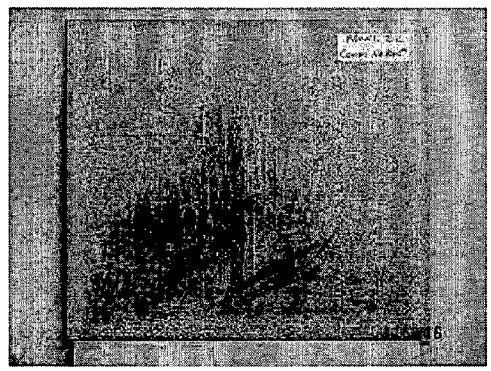
FIG. 1 is a photograph of an upper surface of a damaged panel of an interleaf system (Comparative Example 1) after a simulated lightning strike.
Figure 2:
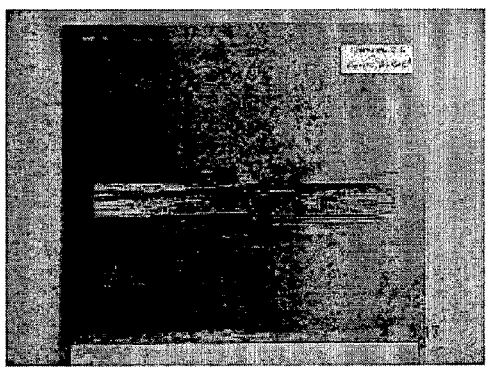
FIG. 2 is a photograph of a bottom surface of a damaged panel of an interleaf system (Comparative Example 1) after a simulated lightning strike.
Figure 5:
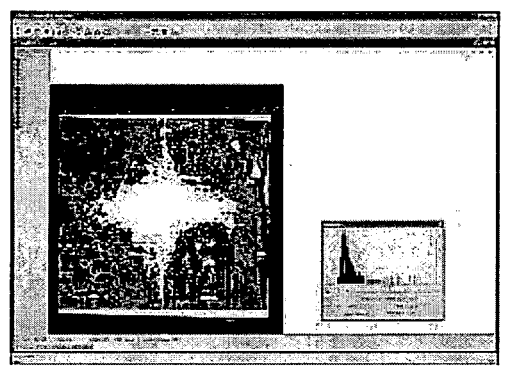
FIG. 5 is an ultrasonic C-scan of a damaged panel of an interleaf system after a simulated lightning strike (Comparative Example 1); damage depth 1-6 plies, damage area 56,000 mm$^2$.

As can be seen from Table 1 and FIGS. 1, 2 and 5, an interleafed system which is not protected from lightning is considerably damaged by a zone 1A simulated strike. Damage is throughout the system which would be catastrophic if this occurred during an actual strike.

Comparative Example 2

Carbon Composite

M21 resin modified with silver coated glass spheres (2 vol. %, 3.5 wt. % of resin), was produced using a Winkworth mixer (Z-blade mixer) and then filmed onto silicone release paper. This resin film was then impregnated onto unidirectional intermediate modulus carbon fibre, using a pilot scale UD prepregger, which produced a prepreg with an areal weight of 190 g/m² at 35 wt. % of resin. Two six-ply prepregs were produced (lay up 0/90) which were approximately 60 cm by 60 cm and these were cured on a vacuum table at a pressure of 7 bar at 177° C. for 2 hours.

The panels were tested to zone 1A as per comparative example 1.

Figure 3:
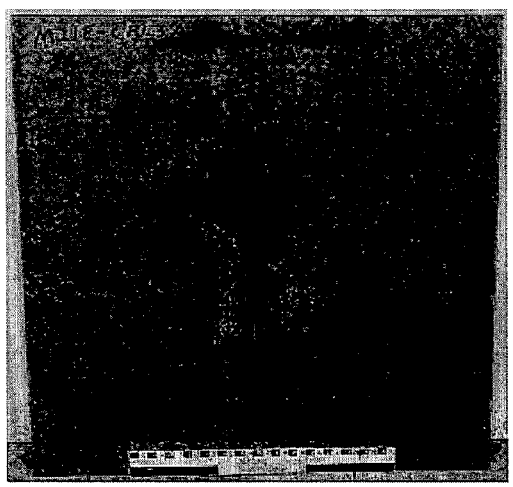
FIG. 3 is a photograph of an upper surface of a damaged panel of an interleaf system containing silver coated hollow glass spheres (Comparative Example 2) after a simulated lightning strike.
Figure 6:
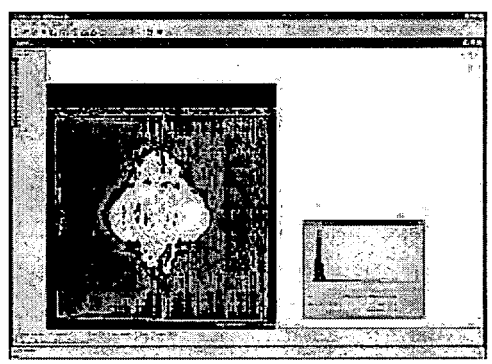
FIG. 6 is an ultrasonic C-scan of the damaged panel of an interleaf system containing silver coated hollow glass spheres (Comparative Example 2); damage depth 1-3 plies, damage area 34,000 mm$^2$.

The addition of electrically conductive particles to an interleaf system has dramatically reduced the damage area from a zone 1A strike. Table 1 and FIGS. 3 and 6 show that the damage depth is reduced by half to the top three plies and the damage area is reduced by 39% which indicates the advantage of adding conducting particles that bridge the resin rich interleaf.

Example 3

Carbon Composite

M21 resin modified with silver coated glass spheres (2 vol. %, 3.5 wt. % of resin), was produced using a Winkworth mixer (Z-blade mixer) and then filmed onto silicone release paper. This resin film was then impregnated onto unidirectional intermediate modulus carbon fibre, using a pilot scale UD prepregger, which produced a prepreg with an areal weight of 190 g/m² at 35 wt. % of resin. Two six-ply prepregs were produced (lay up 0/90) which were approximately 60 cm by 60 cm. Added to the outer ply of the lay-up was Cu—Ni—C veil (34 gsm) supplied by Technical Fibre Products which was impregnated with a film of M21 resin (25 gsm). The panels were cured on a vacuum table at a pressure of 7 bar at 177° C. for 2 hours.

The panels were tested to zone 1A as per comparative example 1.

Figure 4:
FIG. 4 is a photograph of an upper surface of a damaged panel of interleaf system containing silver coated hollow glass spheres with copper-nickel coated carbon veil, 34 gsm, (Example 3) according to the invention after a simulated lightning strike.
Figure 7:
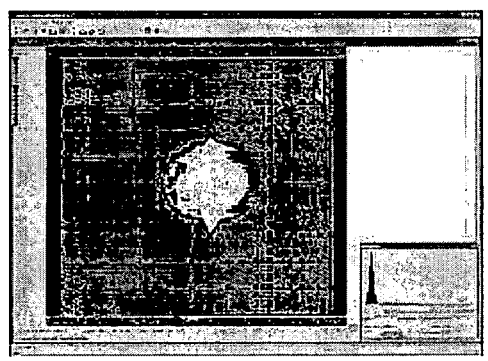
FIG. 7 is an ultrasonic C-scan of the damaged panel of interleaf system containing silver coated hollow glass spheres with copper-nickel coated carbon veil (Example 3) according to the invention; damage depth 1-2 plies, damage area 21,000 mm$^2$.

Table 1 and FIGS. 4 and 7 show that the addition of a ply of Cu—Ni—C veil in conjunction with silver coated hollow glass beads has further reduced the damage area and damage depth to the top two plies after a zone 1A simulated lightning strike.

All tests and physical properties listed have been determined at atmospheric pressure and room temperature (i.e. 20° C.), unless otherwise stated herein, or unless otherwise stated in the referenced test methods and procedures.

The surface resistivity is a measure of resistivity of thin films having uniform thickness. Surface resistivity is measured in ohms/square (Ω/sq.), and it is equivalent to resistivity for two-dimensional systems. The term is therefore a measure of resistivity for a current passing along the surface, rather than through the material which is expressed as bulk resistivity. Surface resistivity is also referred to as sheet resistance.

It is to be understood that the invention is not to be limited to the details of the above embodiments, which are described by way of example only. Many variations are possible.

The invention claimed is:

1. A composite assembly for use in making a lightning strike tolerant composite material, said composite assembly comprising:
    an interleaf structured panel comprising a first fibrous layer comprising an upper surface and a lower surface and a second fibrous layer comprising an upper surface and a lower surface, said first and second fibrous layers being electrically conductive and wherein the lower surface of said first fibrous layer is separated from the upper surface of said second fibrous layer;
    a resin layer located between the lower surface of said first fibrous layer and the upper surface of said second fibrous layer, said resin layer comprising an electrically insulating polymeric resin and having a thickness;
    electrically conductive bridges that extend across said resin layer from the lower surface of said first fibrous layer to the upper surface of said second fibrous layer in order to provide electrical connections between said fibrous layers, wherein at least one of said electrically conductive bridges comprises an electrically conductive particle which has a particle size that is substantially equal to the thickness of said resin layer; and

TABLE 1

| Panel | Test | Component A Peak current (kA) | Action integral (×10⁶A²s) | Component B + C Total charge transfer (Coulombs) | Skin damage |
|---|---|---|---|---|---|
| Comparative Example 1 | | 191.7 | 2.04 | 31.3 | Front: Split, tufted and delaminated over 310 × 300 mm Rear: Delamination over 420 × 180 mm, hole through panel |
| Comparative Example 1 | | 191.7 | 2.04 | 24.3 | Front: Split, tufted and delaminated over 330 × 250 mm Rear: Delamination over 420 × 230 mm, hole through panel |
| Comparative Example 2 | 1 | 205.7 | 2.32 | 24.4 | Front: Split, tufted and delaminated over 400 × 200 mm. Rear: No visible damage |
| Comparative Example 2 | 2 | 205.7 | 2.32 | 24.4 | Front: Split, tufted and delaminated over 400 × 200 mm. Rear: No visible damage |
| Example 3 | 3 | 200.3 | 2.12 | 28.0 | Front: Split, tufted and delaminated over 190 × 140 mm. Rear: No visible damage |
| Example 3 | 4 | 199.0 | 2.11 | 27.8 | Front: Split, tufted and delaminated over 190 × 140 mm. Rear: No visible damage | a top layer located next to the upper surface of said first fibrous layer, said top layer comprising metal-coated carbon fibre and a resin component.

2. A composite assembly according to claim 1, wherein the electrically conductive particles comprise metal-coated conducting particles or non-metallic conducting particles.

3. A composite assembly according to claim 2, wherein said non-metallic conducting particles are selected from carbon particles, graphite flakes, graphite powders, graphite particles, graphene sheets, fullerenes, carbon black, intrinsically conducting polymers, charge transfer complexes, or any combination thereof.

4. A composite assembly according to claim 1, wherein the interleaf structured panel further comprises carbon nanomaterials.

5. A composite assembly according to claim 4, wherein the carbon nanomaterials are selected from carbon nanofibers, carbon nanotubes, or a combination thereof.

6. A composite assembly according to claim 1, wherein the electrically insulating polymeric resin includes additional ingredients selected from flexibilisers, toughening agents/particles, additional accelerators, core shell rubbers, flame retardants, wetting agents, pigments/dyes, flame retardants, plasticizers, UV absorbers, anti-fungal compounds, fillers, viscosity modifiers/flow control agents, tackifiers, stabilisers, inhibitors, or a combination of any two or more thereof.

7. A composite assembly according to claim 6, wherein the toughening agents/particles include any of the following either alone or in combination: polyamides, copolyamides, polyimides, aramids, polyketones, polyetheretherketones, polyarylene ethers, polyesters, polyurethanes, polysulphones, high performance hydrocarbon polymers, liquid crystal polymers, polytetrafluoroethylene, elastomers, and segmented elastomers.

8. A lightning strike tolerant composite material that comprises the composite assembly according to claim 1 that has been cured.

9. An aerospace component comprising a lightning strike tolerant composite material according to claim 8.

10. An airplane comprising a lightning strike tolerant composite material according to claim 8.

11. A composite assembly according to claim 1 wherein at least 50 percent of the electrically conductive particles have a particle size that is within 10 microns of the thickness of the resin layer.

12. A composite assembly according to claim 3 wherein said non-metallic conducting particles comprise carbon.

13. A composite assembly according to claim 1 wherein said electrically conductive particles are present in the range of 0.2 vol. % to 20 vol. % of the composite assembly.

14. A composite assembly according to claim 1 wherein said electrically conductive particles have a diameter in the range of 5 microns to 40 microns.

15. A composite assembly according to claim 1 wherein said fibrous layers comprise carbon fibres that are formed substantially from carbon.

16. A composite assembly according to claim 1 wherein said metal-coated carbon fibres comprise carbon fibres coated with copper and nickel.

17. A composite assembly according to claim 1 wherein said electrically insulating polymer resin comprises an epoxy resin.

18. A composite assembly according to claim 17 wherein said electrically insulting polymer resin comprises polyethersulfone.

19. A composite assembly according to claim 1 wherein said top layer is separated from the upper surface of said first fibrous layer by an additional resin layer, said additional resin layer comprising an electrically insulating polymeric resin and having a thickness, wherein electrically conductive bridges are provided that extend across said additional resin layer from the upper surface of said first fibrous layer to said top layer in order to provide electrical connections between said first fibrous layer and said top layer, wherein at least one of said electrically conductive bridges comprises an electrically conductive particle which has a particle size that is substantially equal to the thickness of said additional resin layer.

* * * * *